Aug. 19, 1941.   R. HOOVER   2,252,852
TELEGRAPH PERFORATOR
Original Filed May 19, 1937   9 Sheets-Sheet 1

INVENTOR
RAY HOOVER
BY
Eugene C. Brown
ATTORNEY

Aug. 19, 1941.                R. HOOVER                2,252,852
                         TELEGRAPH PERFORATOR
            Original Filed May 19, 1937      9 Sheets-Sheet 4
FIG. 4
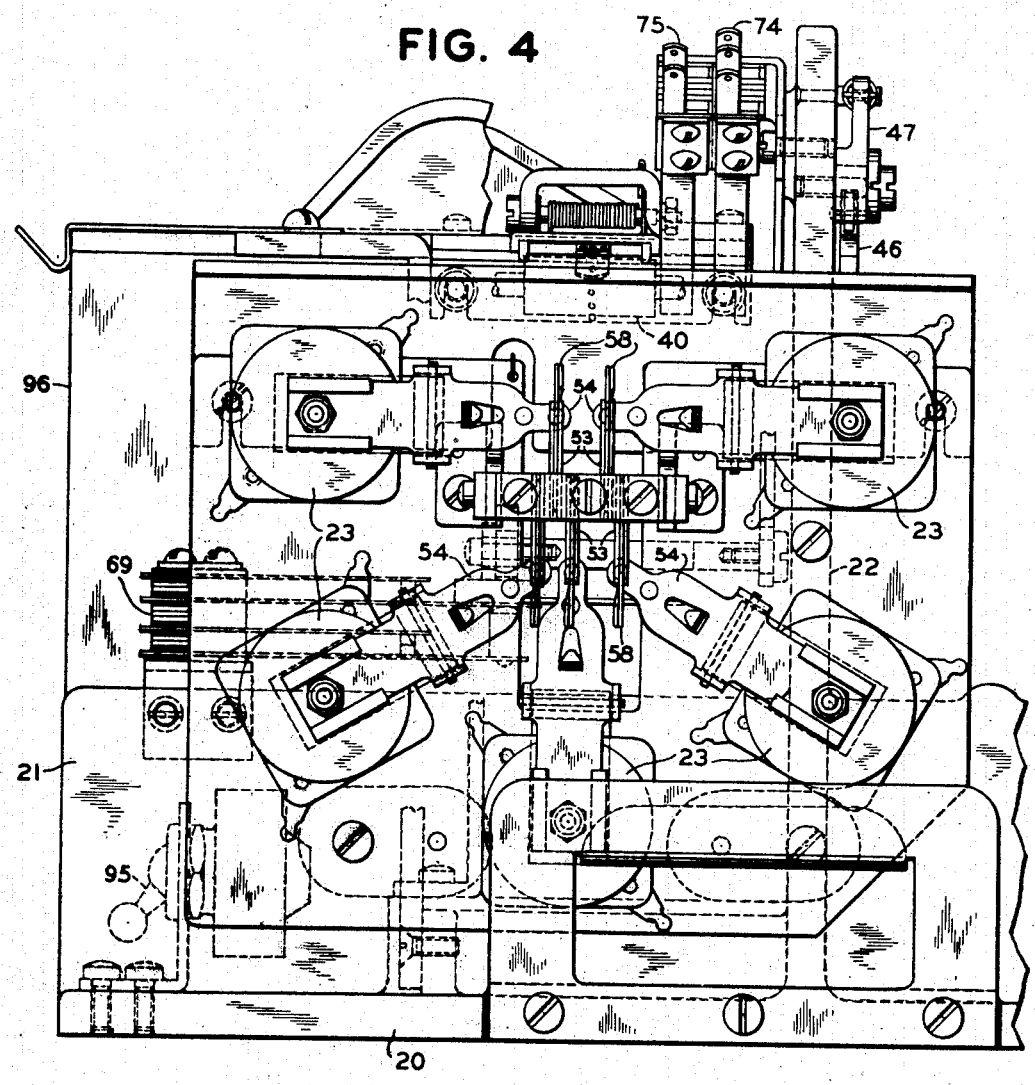
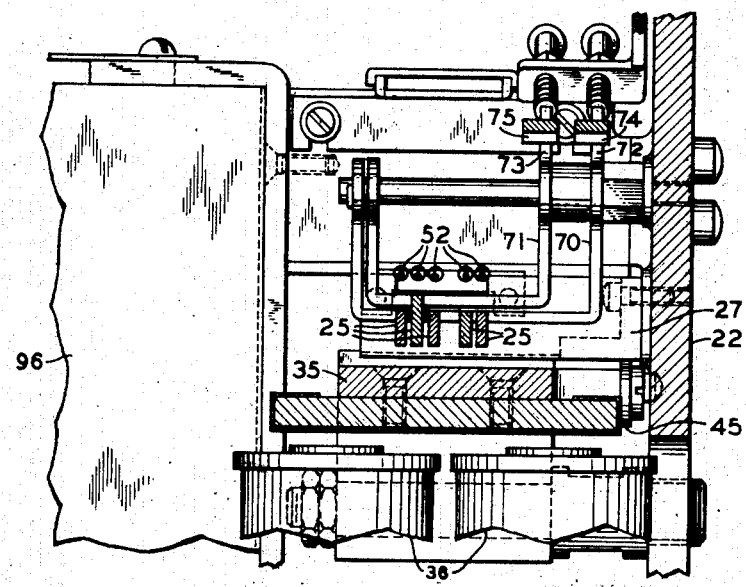
FIG. 8
INVENTOR
RAY HOOVER
BY
*Eugene C. Brown*
ATTORNEY Aug. 19, 1941.          R. HOOVER          2,252,852
TELEGRAPH PERFORATOR
Original Filed May 19, 1937          9 Sheets—Sheet 5

INVENTOR
RAY HOOVER
BY
Eugene C. Brown
ATTORNEY

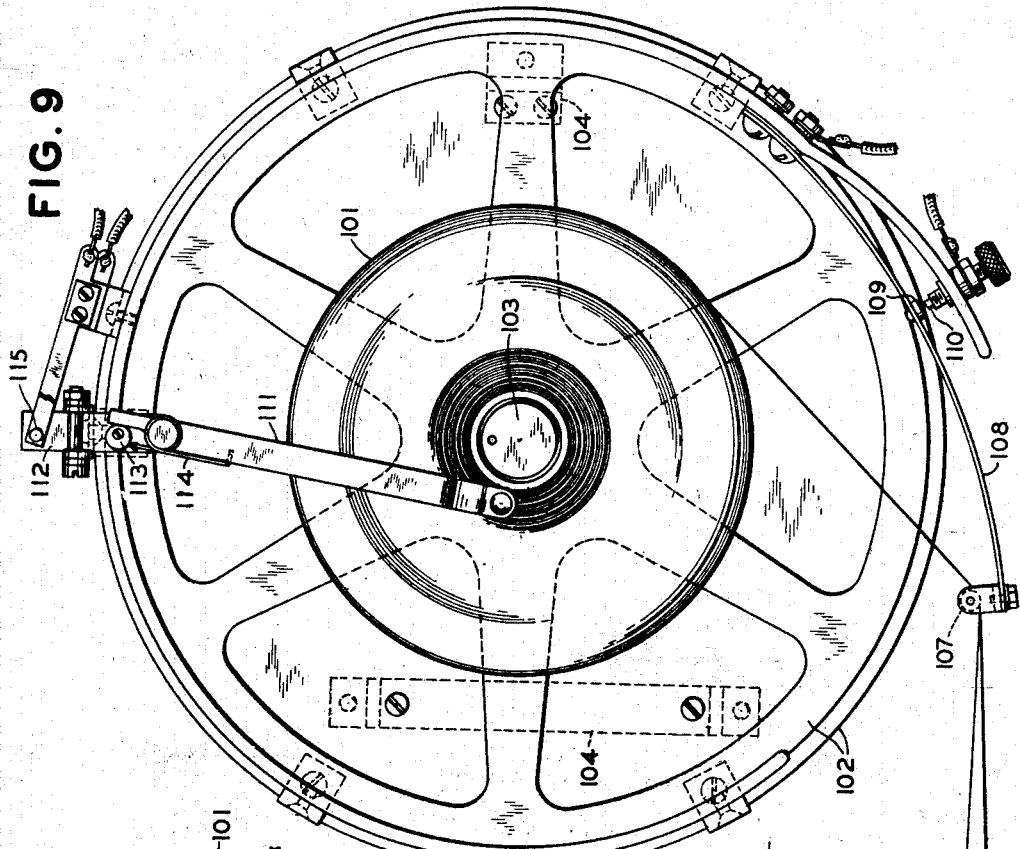
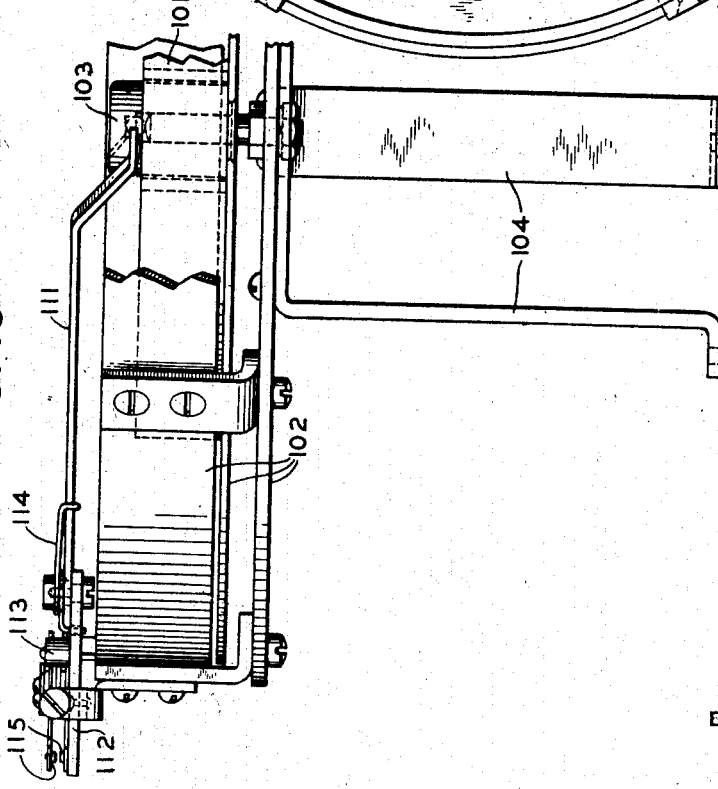

Aug. 19, 1941.  R. HOOVER  2,252,852
TELEGRAPH PERFORATOR
Original Filed May 19, 1937   9 Sheets-Sheet 7
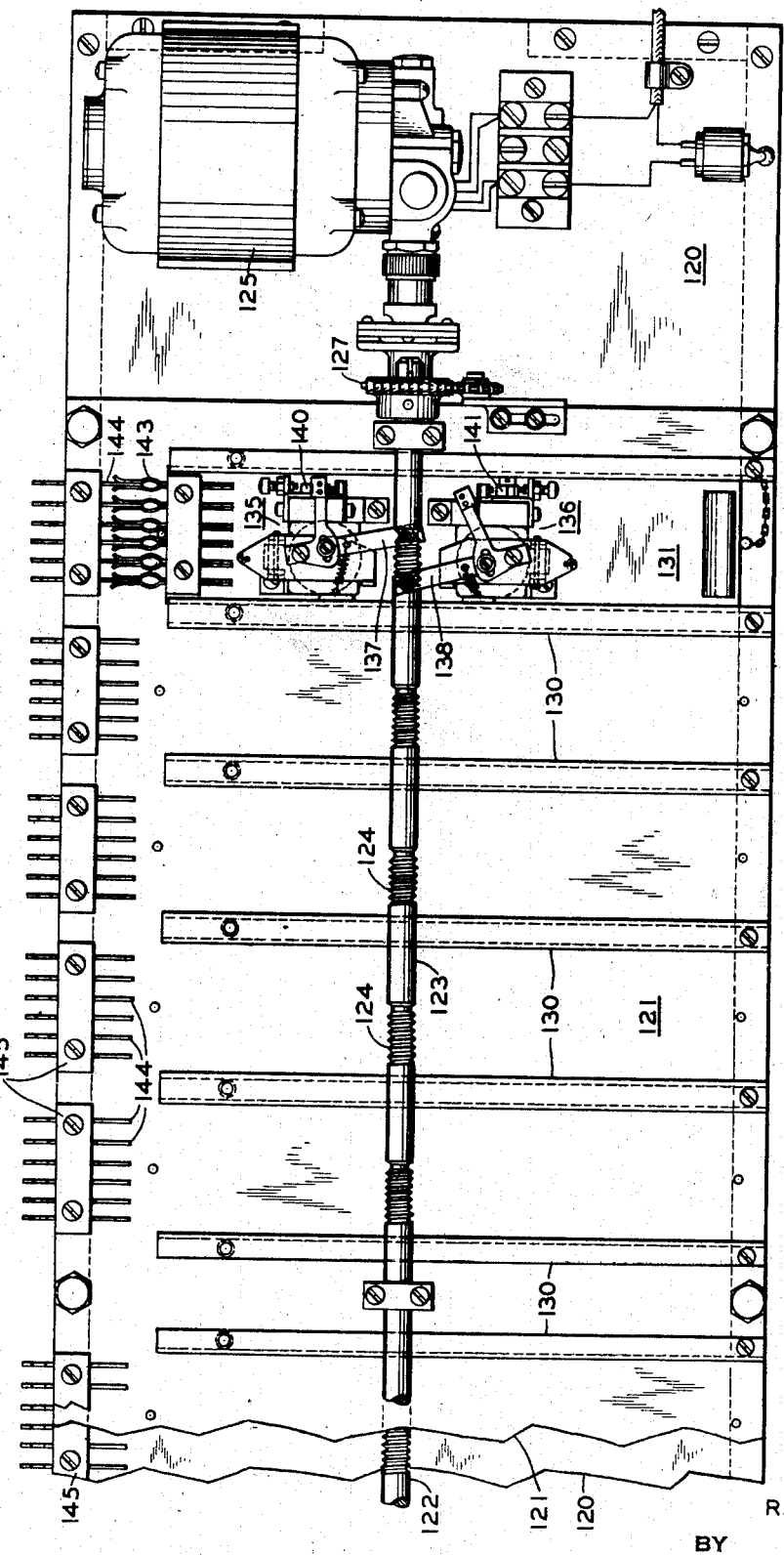
INVENTOR
RAY HOOVER
BY
Eugene C. Brown
ATTORNEY

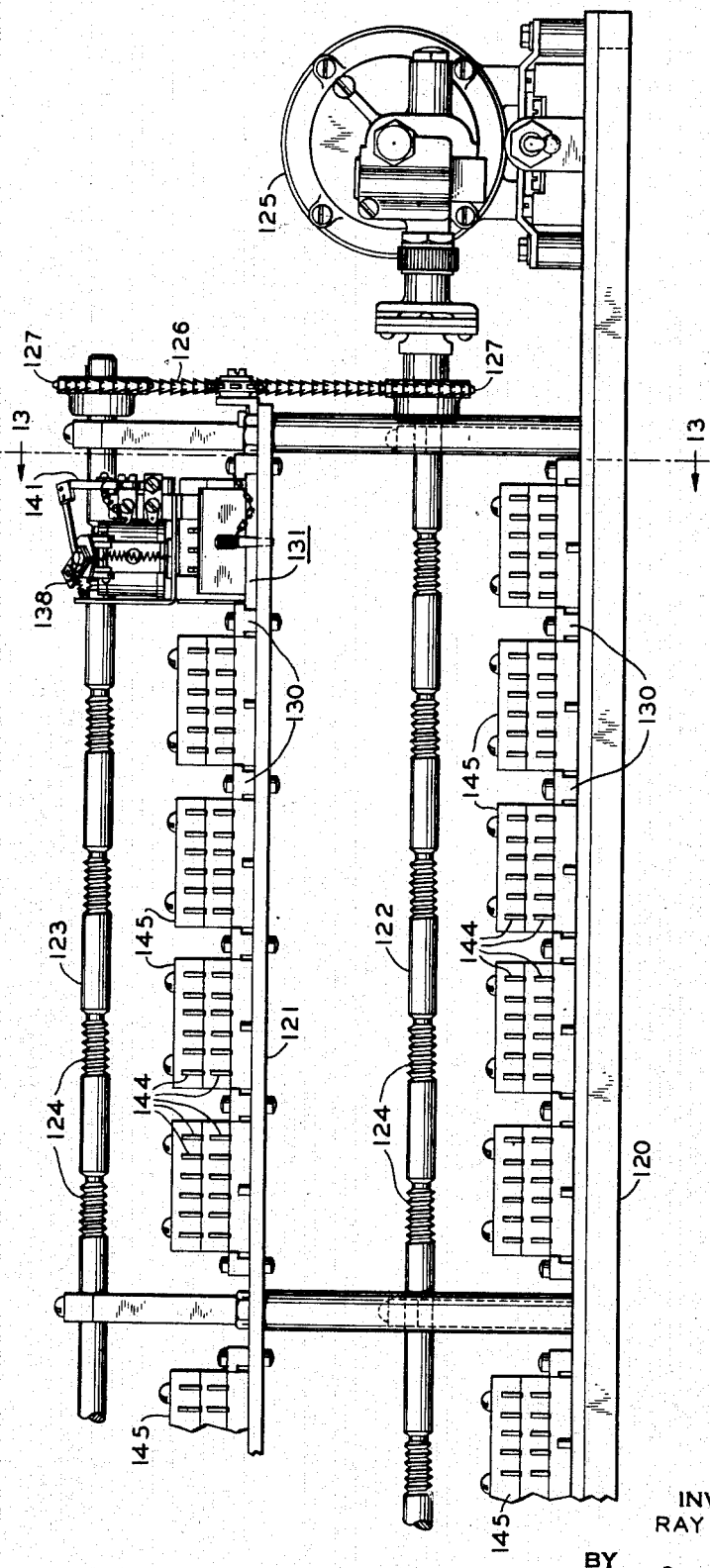

Aug. 19, 1941.    R. HOOVER    2,252,852
TELEGRAPH PERFORATOR
Original Filed May 19, 1937    9 Sheets-Sheet 9

INVENTOR
RAY HOOVER
BY
Eugene C. Brown
ATTORNEY

Patented Aug. 19, 1941

2,252,852

UNITED STATES PATENT OFFICE 2,252,852

TELEGRAPH PERFORATOR

Ray Hoover, Plainfield, N. J., assignor to The Western Union Telegraph Company, New York, N. Y., a corporation of New York Application May 19, 1937, Serial No. 143,616
Renewed July 29, 1939

16 Claims. (Cl. 178—92)

This invention relates to signalling apparatus and systems for recording telegraph code signals or the like in a perforated tape.

The invention is particularly adapted for use in recording telegraph signals transmitted over line circuits or channels at a high rate of speed for subsequent transmission from an ordinary tape transmitter. For example, apparatus embodying the invention may be arranged to perforate tape in printing telegraph systems employing the Baudot code wherein each character comprises a definite number of impulses or signals, the perforated tape being adapted for use with a conventional tape transmitter to repeat the printer signals.

One object of the invention is to improve the elements of the selector mechanism of a tape perforator in order that the apparatus will function reliably at higher speeds than has heretofore been considered practicable.

Another object of the invention is to provide in connection with a selectively operable perforating mechanism, means for closing a circuit or effecting other functions upon the receipt of a predetermined signal or signals.

Another object of the invention is to provide improved means for automatically feeding out blank tape from a receiving perforator or reperforator at the end of each group of received signals.

Another object of the invention is to provide apparatus that will give a definite time delay between the time the last signal or character has been received and the time the blank tape is fed out.

Other objects and advantages of the invention will appear from the following description of a preferred embodiment thereof.

In accordance with the invention a tape perforator having selectively operable punch controlling or interponent bars is provided with reciprocable selector bars which are hinged or hooked to the interponent bars in order that a lateral displacement of one of the interponent bars may not displace or distort the connected selector bar. Preferably, the interponent bars are readily detachable from the selector bars in order that they may be easily replaced. The selector bars are biased toward the punch block and are held in the retracted position by latches which are controlled by the selector magnets or other operating means. Thus the selector bars with the attached interponent bars may be unlatched and reset rapidly during successive cycles of operation, and the mass of the bars being small, the forward movement and restoration may be effected with extreme rapidity.

In accordance with another feature of the invention, a pivoted resetting member is provided for the selector bars, said member being actuated by the punch hammer to insure that the bars are reset at the proper moment. The resetting member preferably comprises a vane or extension which engages a slot in the bars which have been unlatched and arranged to limit the forward movement of the selector bars and also to restore the selector bars to normal; and further comprises a second angularly disposed extension or vane bearing upon the upper surfaces of the selector bars to steady the same without imposing excessive friction against their movement.

Other features of the invention including protective signalling or alarm devices for indicating the derangement of the normal operating functions of the apparatus will become apparent from the following detailed description. Referring to the drawings:

Figs. 2, 3 and 4 are a plan view and end elevations, respectively, of the unit shown in Fig. 1;

Fig. 8 is a fragmentary cross section taken on the line 8—8 of Fig. 1;

Figs. 9 and 10 are plan and side elevations of the tape reel forming a part of the perforator apparatus;

Figs. 11, 12 and 13 are plan, side and end elevational views respectively of a multiple element timing unit employed in connection with a plurality of perforator units in a single system.

Figure 1:
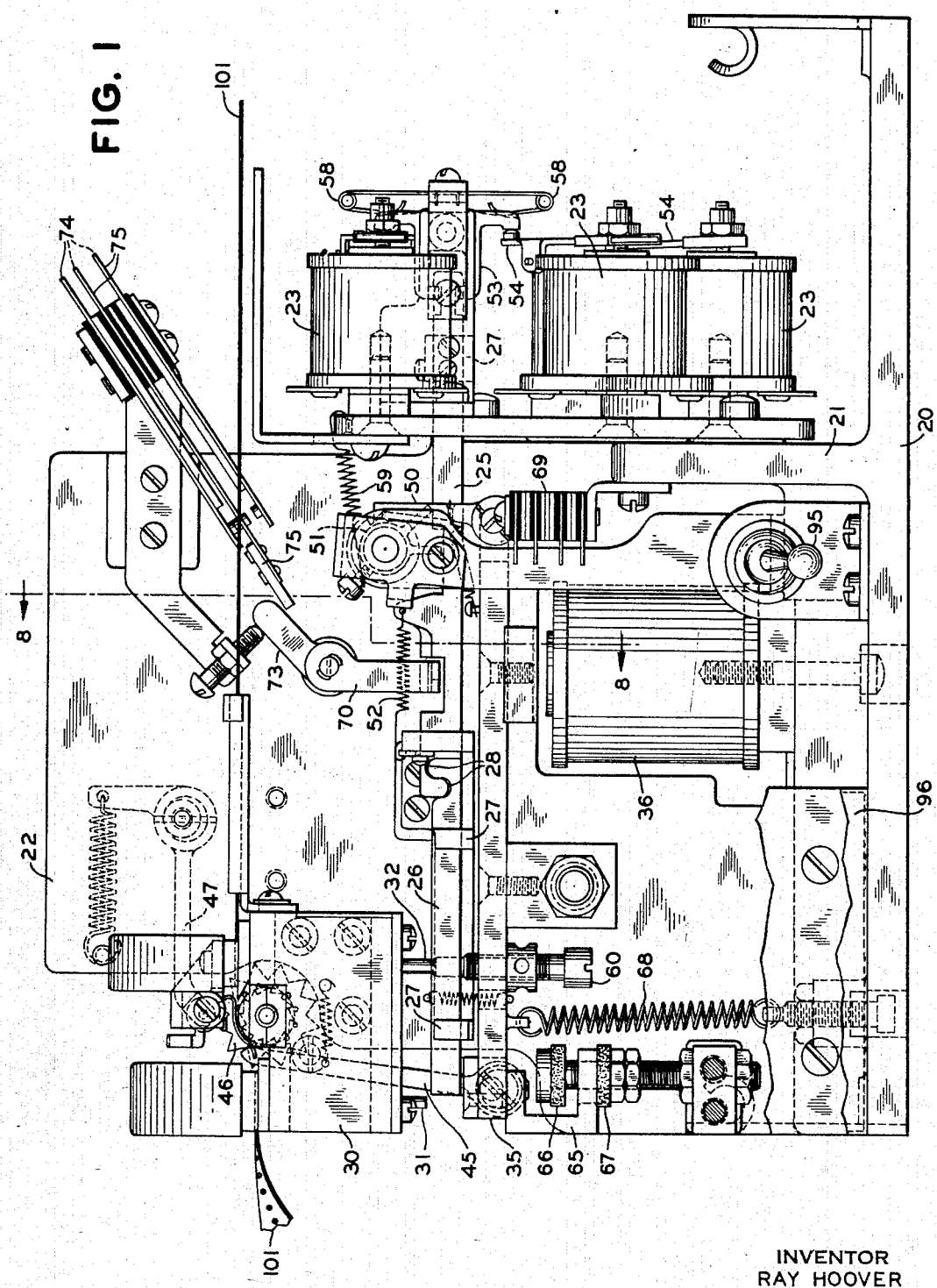
Fig. 1 is a front elevational view of a perforator unit embodying the invention.

Referring to Figs. 1 to 4 of the drawings, a receiving perforator or tape reperforator embodying the invention comprises a base 20 having vertical partitions 21 and 22 at right angles to each other. The partition 21 of the frame carries the selector magnets 23 which in the case of a five-unit telegraph code are five in number. The punching and tape feeding elements of the reperforator unit are carried by the partition 22.

As shown, the perforator unit comprises five reciprocable selector bars 25, each of which is hinged or pivotally connected to a linearly movable punch or interponent bar 26 normally aligned with the selector bars. The respective selector and interponent bars are slidably supported in a horizontal position by notched or slotted cross bars 27 and the adjacent ends of the pairs of bars are notched as indicated at 28, Fig. 1, in order to provide a detachable hinge connection for purposes to be explained hereinafter.

The reperforator unit further comprises a punch block 30 (Figs. 1, 3, 5-7) containing code punch pins 31 and a feed hole punch pin 32, a pivotally supported punch hammer 35 and operating solenoids or magnets 36 for oscillating said punch hammer. The punch block 30 also contains a feed wheel 40 (see Fig. 2) pivoted near the upper end of said block between the feed hole punch pin and the code punch pins, said feed wheel being provided with pins adapted to engage the feed holes in the tape 101 to feed the tape as it is perforated. The punch block shown is similar to that disclosed and claimed in the prior Patent No. 1,830,700 granted to Hoover and Haupt, November 3, 1931. This punch block in which the feed wheel is disposed behind the code punch pins has the advantage that the perforated tape may be fed into an adjacent tape transmitter with only a short length of perforated tape intervening between the perforator and the tape transmitter. However, any suitable punch block may be employed.

The pivoted punch hammer 35 is provided with a pawl 45 engaging a ratchet connected to the feed wheel 40 whereby the feed wheel is turned to advance the tape one character upon each return movement of the punch hammer. The usual star wheel 46 and pivoted detent 47 is provided in connection with the feed wheel 40. A second pawl 50 is provided on the opposite end of the punch hammer, as shown in Figs. 1 and 5, for the purpose of operating a resetting member 51 for resetting the selector bars 25 after each selection has been completed and the corresponding character perforated in the tape by the engagement of the punch hammer with the code punch pins 31 corresponding to the selector bars which have been released.

Figure 5:
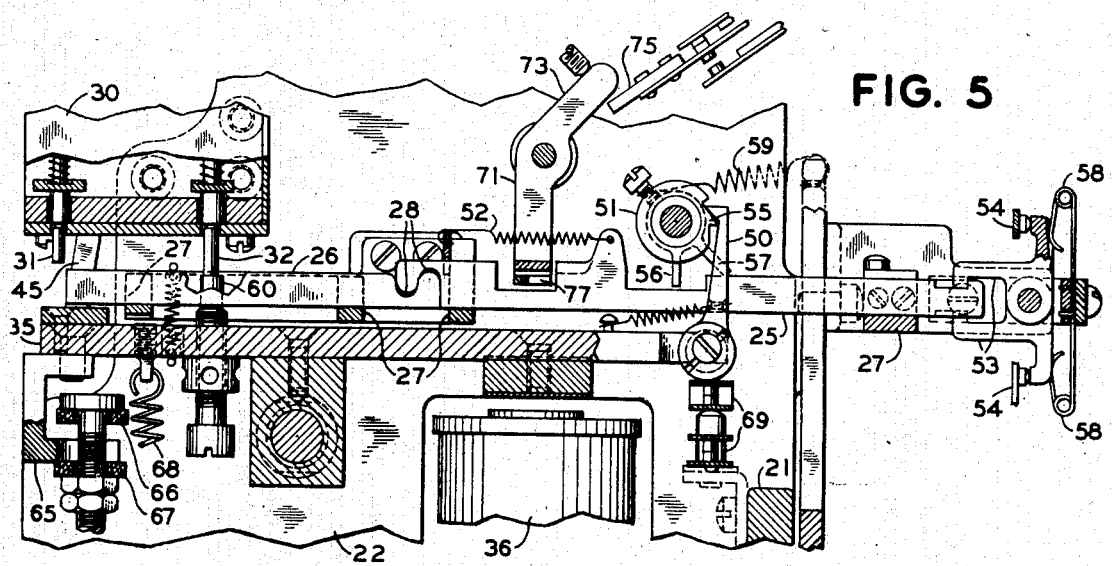
Figs. 5, 6 and 7 are sectional views taken on the line 5—5 of Fig. 2, showing the selecting and perforating mechanism in different operative positions.
Figure 6:
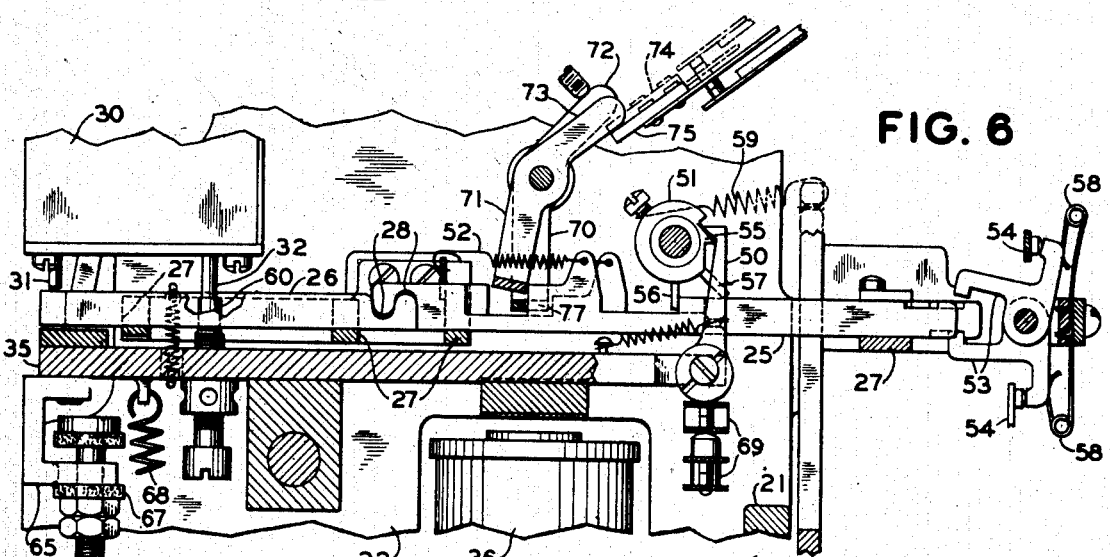
Figure 7:
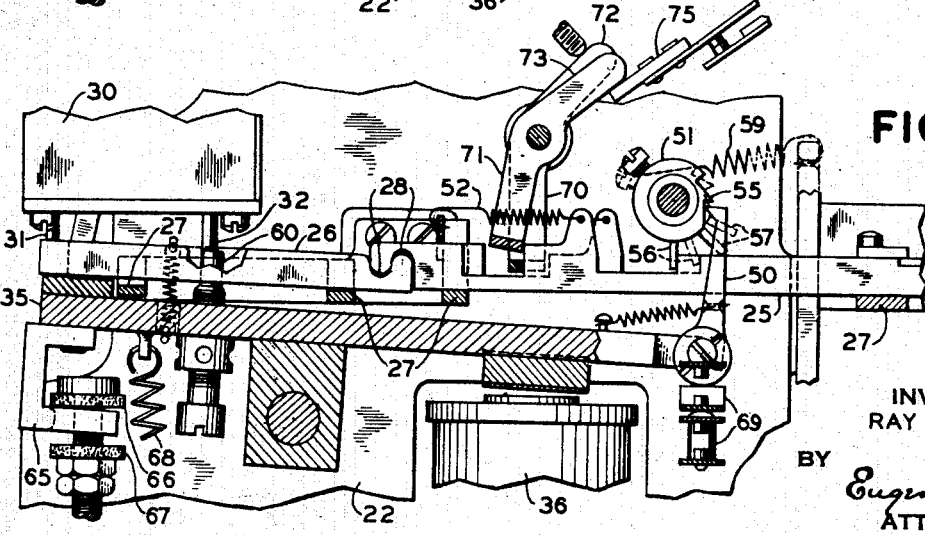

As shown more clearly in Figs. 5, 6 and 7, the selector bars 25 are normally biased to the left by the selector bar springs 52. The selector bars, however, are held in their retracted positions by latches 53. In order to unlatch the selector bars the pivoted armatures of the selector magnets are provided with extensions 54 engaging the respective latches and adapted to turn the same to a position in which the corresponding selector bar is released for movement under the influence of the selector bar springs 52. While five selector magnets and selector bars are shown, obviously any number could be employed depending upon the use to which the perforator is applied.

The movement of the unlatched selector bars as described shifts the end of the corresponding interponent bars 26 underneath the code punch pins 31 whereby the punch hammer is effective to perforate the corresponding hole in the tape. In Fig. 6 one of the selector bars is shown unlatched and the end of the interponent bar is in registry with one of the code punch pins 31. Upon the energization of the solenoids 36 as shown in Fig. 7, the punch hammer raises the end of the interponent bar which has been projected underneath the code punch pin 31 and the punch pin is projected through the tape, this figure showing clearly how the hinge connection between the interponent and selector bars permits the lateral or upward displacement of the interponent bar without displacing the selector bar. Thus the selector bar is not moved with respect to the stop and reset member, obviating wear and distortion of the selector bars with consequent binding of the bars after extended operation. The stud 60 carried by the punch hammer engages the feed hole punch pin 32 to punch a feed hole in the tape each time the punch hammer operates.

Upon the deenergization of the punch magnets or solenoids 36, the punch hammer is released and the unlatched selector bars with their corresponding interponent bars are quickly restored to normal. In its preferred form the resetting member 51 comprises a pivoted sleeve having at one end thereof a ratchet tooth 55 (see Figs. 5, 6 and 7) adapted to be engaged by the pawl 50 carried by the punch hammer, said sleeve being further provided with two angularly disposed extensions or vanes 56 and 57. The vane 56 extends into a slotted portion of the selector bars so that it serves as a stop for the unlatched selector bars and as the resetting member 51 is rocked by the engagement of the pawl 50 with the ratchet tooth 55, any selector bar which has been unlatched is moved to the right as shown in Fig. 7 in a position to be latched by the corresponding latch member 53 under the influence of the latch spring 58. The second extension or vane 57 as shown in Figs. 5 and 6 normally rests on the upper surfaces of the selector bars 25 and serves to steady the same as they are drawn forward by the selector bar springs 52. Preferably limit stops are provided as shown in Fig. 1 for the resetting member 51 to limit the angular movement thereof in either direction, thereby preventing overtravel of the unlatched selector bars and controlling the pressure between the vane 57 and the top surfaces of the selector bars.

As the punch hammer and its associated resetting pawl 50 rise from the depressed position shown in Fig. 7, the pawl 50 engages the tooth 55 and rotates the resetting member 51 to restore the selector bars by engagement of extension 56 thereof with the ends of the slots in the respective bars. As the pawl 50 approaches its uppermost position, the underside of the tooth 55 reaches an angle at which the end of the pawl 50 slides off from the end of the tooth 55 whereupon the resetting member 51 is returned to its normal position as shown in Fig. 5 by the spring 59.

Thus the resetting of the selector bars and interponent bars which have been unlatched is started as the punch hammer returns to normal and the restoration of both the bars and the resetting member 51 is completed practically simultaneously with the return of the punch hammer to normal position. The selecting elements of the perforator are reset therefore for the next cycle of operation with extreme rapidity and a higher speed of operation may be maintained than in the case of similar apparatus in use heretofore. It will also be apparent that the hinge or hook connection between the selector bars and the interponent bars permits the replacement of the interponent bars when necessary as the same are readily detached by removing the punch block 30 and lifting the outer end of the interponent bar until the inner end is freed from its engagement with the selector bar.

The punch hammer is also provided with a U-shaped stop member 65 adapted to engage the stationary abutments 66, 67 as the solenoids 36 are energized and deenergized. A spring 68 is provided to bias the punch hammer to its retracted position. The punch hammer is also arranged to operate contacts 69, the purpose of which will be explained in connection with the circuit diagram of Fig. 14.

In accordance with a further feature of the invention, the reperforator embodies means for closing a control circuit upon the reception of a predetermined signal or signals. In the embodiment shown, this control means includes two pivoted bail members 70 and 71 (see Figs. 1 and 8), said bail members being arranged to be oscillated by engagement with certain of the selector bars 25. The bail members further comprise upstanding portions 72 and 73 adapted to engage movable contact members 74 and 75, respectively. The control device shown is constructed to operate in response to the "period dot" character in which only the fourth impulse is marking but obviously by a simple rearrangement of the parts, could be constructed to respond to any desired combination. In order to respond to the operation of the fourth selector bar only, the bail 70 is arranged to be oscillated by the movement of the first, second, third or fifth selector bars and is slotted as indicated at 77 (see Fig. 6) so that it is not operated by the fourth selector bar. On the other hand the bail 71 is arranged to be operated only by the fourth selector bar which is wider than the other selector bars adjacent the bail members 70 and 71 as shown in Figs. 5-8. The contact member 75 operated by the fourth selector bar is arranged to close a circuit whenever the fourth impulse of the selection is marking and the fourth selector bar is released, and the portion 72 of the bail member 70 is arranged to operate the contact member 74 to open a circuit when a selection having the first, second, third or fifth impulse marking is received. Thus a series circuit through the two contacts will be closed only upon the reception of the "period dot" character for a purpose to be hereinafter described in connection with the wiring diagram of Fig. 14.

Figure 2:
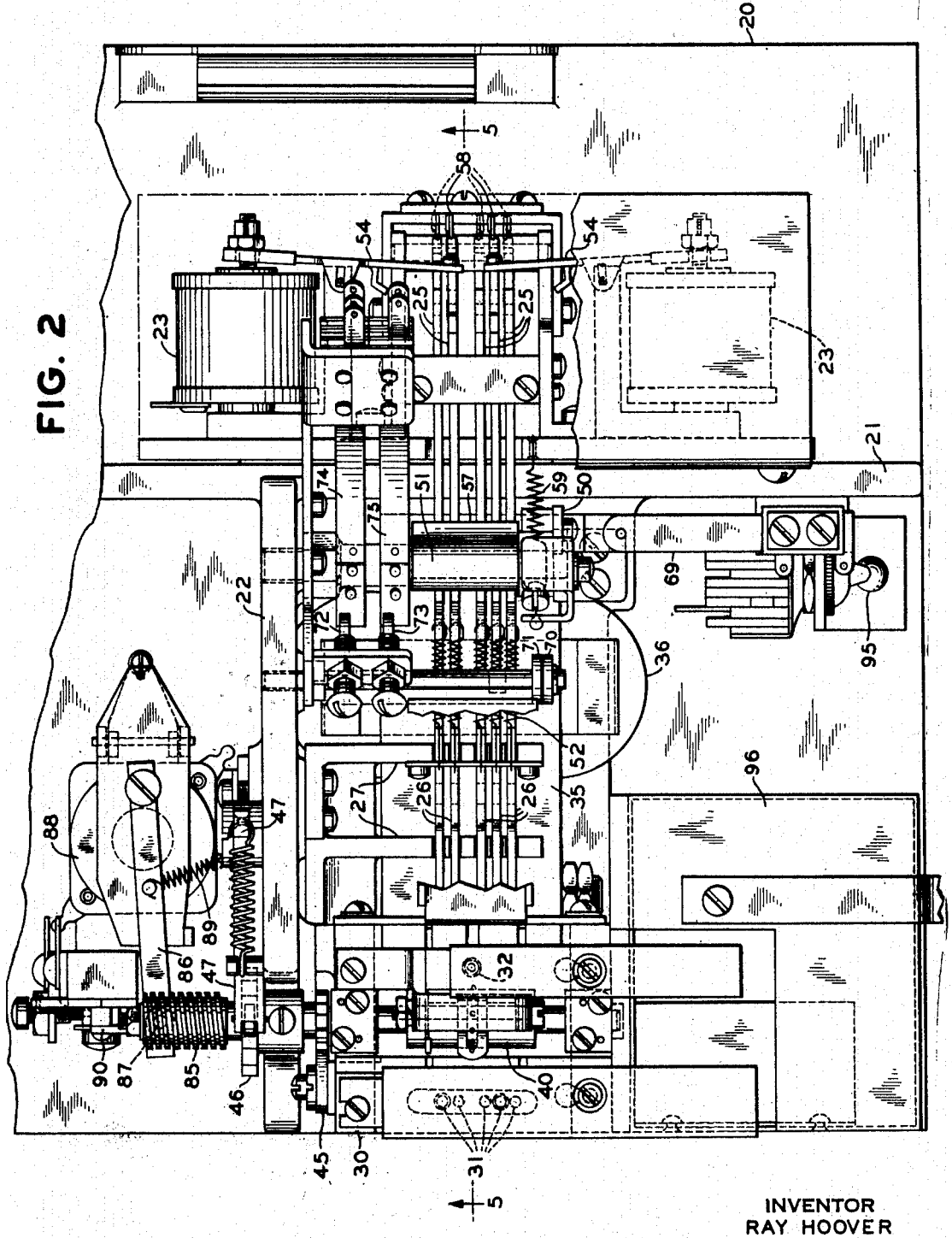
Figure 3:
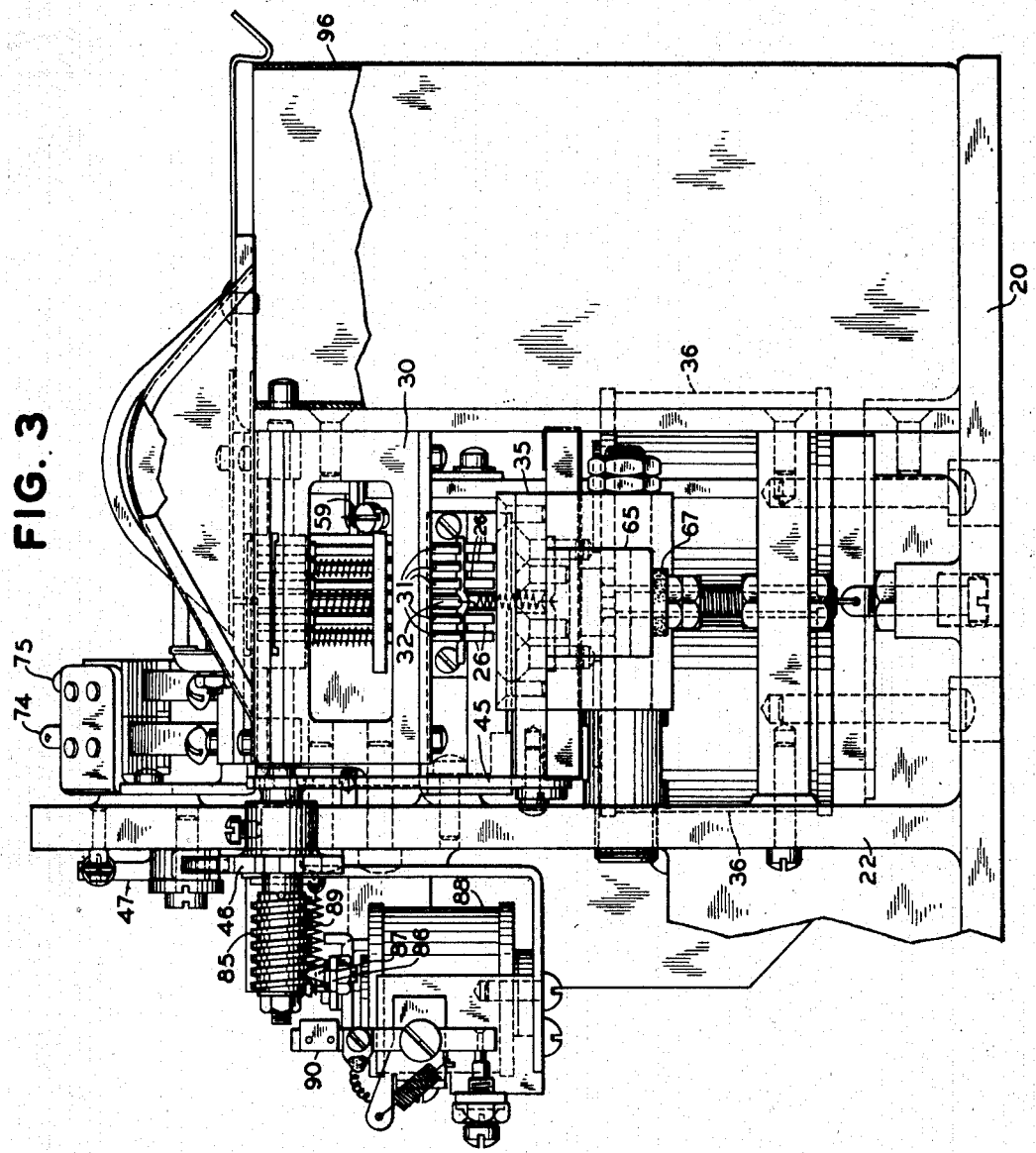

Referring to Fig. 2, the shaft of the feed wheel 40 of the punch block carries a worm 85 which is rotated as the tape is fed through the reperforator. A contact operating arm 86 having a pin 87 engaging the worm 85 is arranged to control a circuit for feeding out a predetermined length of tape when the signals cease. The timing mechanism comprising the worm 85 and contact arm 86 is not novel per se. As shown more clearly in Figs. 2 and 3, the engagement of the pin 87 of the contact arm 86 is controlled by a magnet 88 and when the magnet 88 is energized, the arm 86 is released and a spring 89 restores the contact arm 86 to its normal retracted position. If, however, the magnet 88 is not energized before the worm 85 has actuated the arm 86 to the limit of its travel, the arm 86 engages a contact device 90 to open a circuit. The operation of the tape feedout control mechanism will be described in connection with the detailed wiring diagram of Fig. 14.

A manually operable control switch 95 (see Figs. 1, 4 and 14) is provided to render the blank tape feedout mechanism inoperative when desired. The reperforator is also provided with a removable box or container 96 adjacent the punch block 30 to receive the punchings from the perforating mechanism.

Tape tie-up signal

Referring to Figs. 9 and 10, a roll of tape 101 is supported adjacent the perforating mechanism in a tape reel 102. The tape reel comprises a pivoted supporting member having an upstanding central spindle 103 adapted to receive the roll of tape. The reel is supported upon legs 104 of such height as to hold the roll of tape opposite the inlet to the punch block of the perforating mechanism. Between the roll of tape on the tape reel and the tape perforator, the tape engages a pivoted roller 107 carried by a leaf spring 108 which in turn carries a contact 109 adapted to engage a stationary contact 110 supported on the edge of the tape reel. The positions of the contacts 109 and 110 and the tension in the spring 108 are such that the intermittent tightening and slackening of the tape fed into the perforator causes the contact 109 to engage and disengage the contact 110 thereby intermittently opening and closing the circuit through the contacts. However, when the feeding of the tape ceases, the spring 108 causes the contacts 109 and 110 to engage and the continued closure of the circuit including said contacts is employed to indicate tie-up of the tape as will be explained in connection with the wiring diagram of Fig. 14. Thus if the contacts remain closed while signals are being received, either because of failure of the tape to feed as a result of the tearing of the tape between the feed holes or because the tape is broken, an alarm may be operated to call the attendant in order to prevent the loss of signals. No claim is made herein to means responsive to breakage of the tape or to failure of the tape to feed through the perforator, claims to this feature of the invention forming the subject matter of my divisional application Serial No. 216,866, filed July 1, 1938.

A further alarm signal may be provided which is operated when the supply of tape in the tape reel is almost exhausted. In the embodiment shown the low-tape supply alarm comprises a pivoted arm 111 carried by a pivoted contact member 112 and extending adjacent the central portion of the roll of tape. The position of the inner end of the arm 111 with respect to the center of the roll of tape may be adjusted by means of an eccentric 113, the outer end of the arm being held against the eccentric 113 by spring 114. It will be apparent that when the roll of tape is nearly exhausted the arm 111 is no longer supported thereby and the weight of the arm raises the contact member 112 to close contacts 115 and thereby light a lamp or operate a signal or both to call an attendant in order that the roll of tape may be replaced.

Auxiliary timing unit assembly

Figure 13:
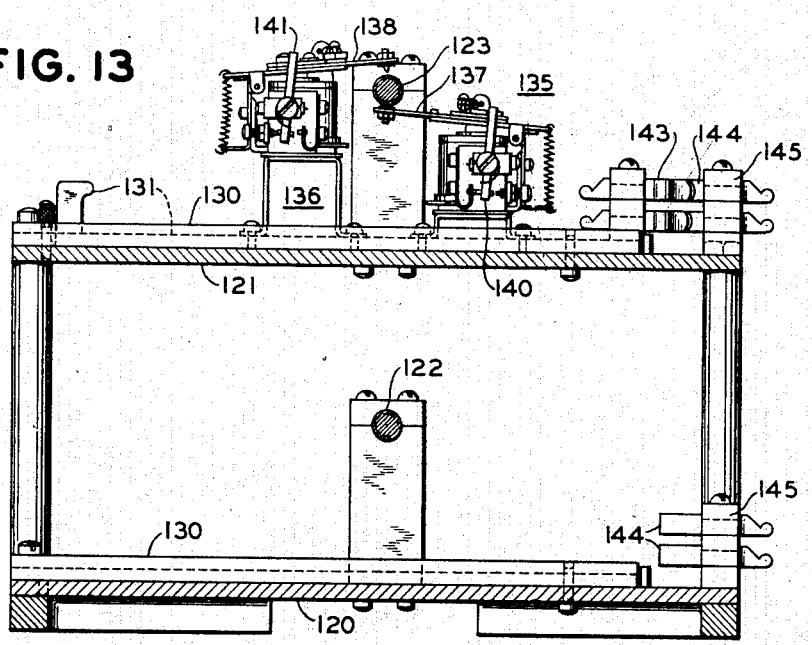

Referring to Figs. 11, 12 and 13, several auxiliary timing devices may be required in a system employing a number of reperforators as in a telegraph office where a number of trunks or branch office circuits terminate. The timing devices illustrated are of a conventional type employing continuously rotating worm members similar to that described above in connection with the tape feedout timing unit. In order to avoid the necessity for a separate source of power operating each rotating worm member for each individual timing unit, a number of units may be arranged on a base 120 and a sub-base 121. Rotating shafts 122 and 123 are arranged above each of said bases, each of said shafts having a plurality of threaded portions or worms 124. The shafts 122 and 123 are driven by a common driving motor 125 through any suitable driving connection which may include a chain 126 engaging sprocket wheels 127 on the respective drive shafts. Suitable guide members 130 are provided on the bases 120 and 121 adapted to cooperate with the base portions of the timing units 131. As shown more clearly in Figs. 12 and 13, each timing unit may comprise two contact assemblies 135 and 136 controlled by separate magnets and by separate operating arm members 137 and 138 respectively, one of said members being adapted to engage the underside of the worm portion of the drive shaft and the other member to engage the upper side of said worm portion. Thus the contact assembly 135 is adapted to be disengaged from the worm and reset by the energization of its operating magnet whereas the contact assembly 136 is disengaged from the worm and reset by the deenergization of its operating magnet. The contact assembly 135 includes a movable contact member 140 adapted to be actuated after a predetermined time interval if the timing unit is not reset and the contact assembly 136 is provided with a similar contact member 141 adapted to be operated after a predetermined time interval. The timing units may be provided at one end thereof with contacts 143 adapted to engage the knife contacts 144 of the terminal block 145 supported on the timing unit assembly when the units are inserted in place and the act of inserting the unit in the assembly also positions the operating members 137 and 138 of the timing unit in operative relation to the continuously rotating worms 124 of the drive shafts 122 and 123 (see Fig. 13). The contact members 143 are normally wired to the magnets and contacts of the timing units, the wiring connections being omitted in Figs. 11-13 for the sake of clearness.

*Operation of reperforator*

Figure 14:
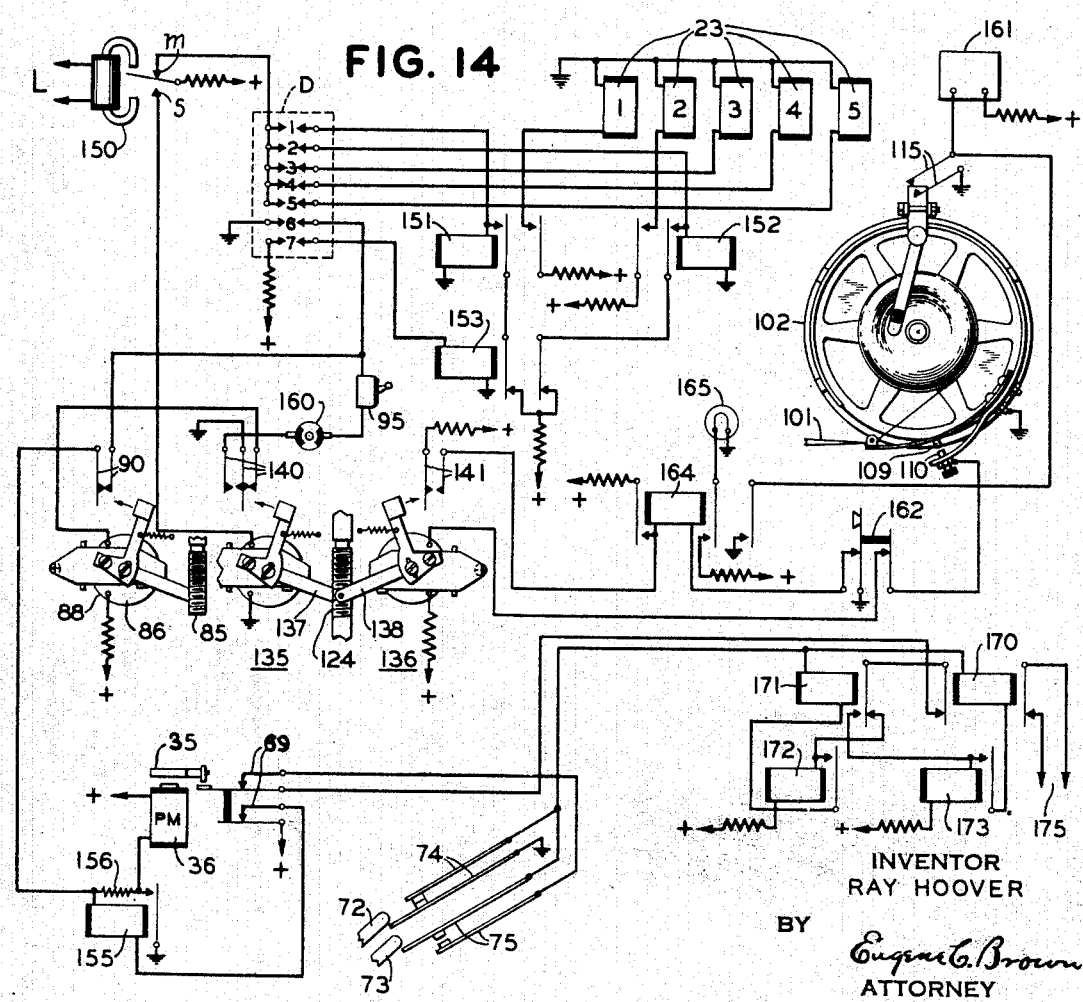
Fig. 14 is a wiring diagram of the reperforator unit shown in Figs. 1 to 10 showing the controlling and associated signalling circuits.

Referring to Fig. 14, the detailed operation of the reperforator or receiving perforator will be clear from the typical wiring diagram shown by way of example in this figure. In the system shown, the receiving perforator is arranged to respond to start-stop signals received over the line L, the selector magnets 23 of the perforator being controlled by contacts of a line relay 150 to which the respective magnets are connected successively by a conventional start-stop distributor D. The other operating, control and guard elements of the system described above are designated by the same reference numerals in the wiring diagram.

The distributor D may be similar in construction to that shown in the patent to Rothermel, No. 1,805,374, dated May 12, 1931, and is provided with seven cam controlled contacts which are closed in properly timed relation to impress the operating impulses upon the five selector magnets 23 and to control the perforating and stepping functions of the reperforator. Contacts 1—5 of the distributor are closed one after another during the reception of the five selecting impulses of the code representing each character transmitted over the line L. The armature of the line relay 150 is normally in engagement with its upper or marking contact and is actuated into engagement with the lower or spacing contact upon the reception of the start pulse. If the first impulse of the code is marking, a circuit is closed from battery through the upper contact of the line relay 150, contact No. 1 of the distributor and the winding of relay 151 to ground whereupon relay 151 becomes energized and closes the circuit of the first selector relay 23. Relay 151 also becomes locked up through a locking circuit including the inner armature and front contact of said relay and the inner armature and back contact of relay 153. In a similar manner the relay 152 controls the energization of the second selector magnet 23 if the second impulse is marking. The third, fourth and fifth selector magnets 23 are connected directly through the third, fourth and fifth contacts of the distributor D to the marking contact of the line relay 150 so that these magnets are operated directly from the distributor if marking impulses are received.

The seventh contact of the distributor D is arranged to close the circuit of relay 153 to unlock relays 151 and 152. This seventh distributor contact is closed at the same time that the No. 3 selection impulse is received. Thus the first and second selection impulses are stored by relays 151 and 152 until the reception of the third selection impulse to insure proper operation of the first and second selector bars in case the punch and selector bars have not yet been restored or blank tape feedout impulses are being received from auxiliary controlling apparatus hereinafter described at the time when the initial impulses of a new character code combination are being received by the reperforator. It will be apparent that the energization of the punch magnets would prevent the release of the selector bars so that it is necessary to store the first and second selector impulses unless other means are provided for preventing the operation of the punch hammer at the time when a code combination is received.

The sixth distributor contact is closed immediately after the receipt of the fifth selecting impulse thereby closing a circuit through the contacts 90 of the tape feedout unit 88, the winding of relay 155 and the lower normally closed contacts 69 associated with the punch hammer 35, whereupon relay 155 becomes energized and closes a circuit through its armature and front contact for energizing the punch magnets 36. When relay 155 operates it becomes locked up through its armature and front contact and resistance 156 thereby maintaining the circuit of the punch magnets 36 closed until the operation of the punch hammer 35 opens contact 69. As the punch hammer 35 reaches the bottom of its stroke, the lower contacts of switch 69 are opened releasing the punch hammer and opening the circuit of relay 155 whereupon the tape in the reperforator is stepped and the selector bars reset as described above. The reperforator is thus in condition for the reception of another code combination.

The operating magnet of the timing contact unit 135 is connected in circuit with the spacing contact of line relay 150 whereby the timing unit is reset upon the occurrence of each spacing impulse over the line circuit. During the reception of signals spacing impulses recur frequently thereby continuously restoring the timing unit 135 to its normal or retracted position as long as signals are received. However, when the signals cease the continuously rotating worm 124 of the timing unit after a predetermined time interval causes the actuation of contact 140, breaking the circuit through its right hand contact and closing a second circuit through its left hand contact. In this manner the operating magnet 88 of the tape feedout unit is deenergized and a circuit is closed from ground through the contact 140, an interrupter 160, control switch 95 and contacts 90 of the tape feedout unit for intermittently operating the relay 155 and associated punch magnet 36 to step out blank tape from the reperforator. When sufficient blank tape has been fed to insure that the last signal received will reach the tape transmitter associated with the reperforator, the tape feedout unit controlled by magnet 88 opens the contacts 90 and prevents further feeding of blank tape. The amount of blank tape fed after the cessation of signals to the reperforator can be adjusted by suitable adjustment of the position of the arm 86 of the tape feedout unit.

In connection with the tape reel 102, the low tape supply contacts 115 may be arranged to control the alarm signal 161 as indicated when the supply of tape is exhausted. The contacts 109 and 110 of the tape reel may be connected as shown through a key 162 to the operating magnet of the timing unit 136. During normal operation the intermittent disengagement of contacts 109 and 110 periodically opens the circuit of the magnet of the timing unit 136 and restores the same to normal. If, however, the contacts 109 and 110 remain closed as a result of breaking of the tape during a time when signals are received by the reperforator, the timing unit 136 is arranged to close contacts 141 in circuit with an alarm relay 164. In order that this circuit may not be closed during the time that the reperforator is inoperative, the system may include a switchboard circuit or contact such as shown in the patent to R. F. Blanchard et al., No. 2,193,811, granted March 19, 1940, relating to a reperforator switching system in which the present reperforator may be employed. The operation of relay 164 closes through the right hand armatures of said relay circuits for energizing the alarm signal 161 and the alarm lamp 165 to call the attention of an attendant to the fact that the operation of the apparatus is faulty. Relay 164 becomes locked up through its left hand armature and front contact independently of the contacts of the timing unit 136 so that it is not released until the key 162 is actuated. The operation of key 162 also restores the timing unit 136 to normal by opening the circuit of the operating magnet of said unit.

As described above the contact member 74 associated with the selector bars of the reperforator is operated if either the first, second, third or fifth selector bar is operated, and the contact member 75 is actuated only when the fourth selector bar is operated. Thus a circuit is closed from ground through the contact members 74 and 75 in series upon the reception of a "period dot" character in which only the fourth impulse is marking, the circuit further including the upper contact members of switch 69 associated with the punch hammer, the left hand armature and back contact of relay 170, the right hand armature and back contact of relay 171 and the winding of relay 172 whereupon relay 172 becomes energized. Upon the energization of relay 172 a circuit is closed from battery through the winding of relay 172, the armature and front contact of said relay, the winding of relay 171 and contact member 74 to ground. However, relay 171 does not become energized because its winding is short-circuited by a circuit including its armature and back contact and the left hand armature and back contact of relay 170, upper contacts of switch 69 associated with the punch hammer and contacts 75. Upon the operation of the punch hammer, however, the above described circuit in shunt to the winding of relay 171 is opened at the upper contacts of switch 69 and also by the restoration of contacts 75 as the fourth selector bar is restored. Thereupon relay 171 becomes energized in series with relay 172 in response to the occurrence of a code combination representing the "period dot" character.

Preferably the control device is arranged to respond only to two "period dot" characters in succession in order that the device may be used for control purposes in response to a plurality of characters which do not occur in normal transmission of messages but which may be added to a message at the point when the control function is to be effected. It will be apparent that upon an occurrence of a second "period dot" character immediately following the first, the closure of contacts 74 and 75 for the second time completes a circuit through the left hand armature and back contact of relay 170 and the armature and front contact of relay 171 for energizing relay 173 whereupon relay 173 becomes energized. When the described energizing circuit of relay 173 is interrupted at the upper contacts of switch 69 associated with the punch hammer, relay 173 locks up through its armature and front contact in series with relay 170 whereupon relay 170 becomes energized. Relay 170 may be arranged to open a control circuit 175 to effect any desired function, as for example to stop the transmitter which is sending to the reperforator where the double "period dot" is used as an end-of-message signal as disclosed in the above mentioned copending application of Blanchard et al. It will be also apparent that if only one "period dot" character is received followed by any other selection, relays 171 and 172 become energized and are immediately released by the opening of the locking circuit through contact members 74, which is opened when any character having the first, second, third or fifth code impulse marking is received. If a blank character (all-spacing) is received, relays 171 and 172 will merely remain locked up until the next code combination is received.

It will be apparent that the tape perforator which has been described in detail in order to explain the invention embodies a number of advantages. The mechanism has been subjected to rigorous tests in actual service and found to give satisfactory reliable operation under the stringent requirements of service in high-speed printing telegraph exchange systems. Various modifications in the detailed structure will occur to those skilled in the art, however, and such changes may be made without departing from the scope of the invention as defined in the appended claims. No claim is made herein to the tape tieup signal and related features, this subject matter being claimed in my divisional application Serial No. 216,866, filed July 1, 1938.

I claim:

1. A tape perforator comprising a punch hammer, movable selector bars, latching means for said bars, a resetting member for said bars to restore the same to latched position and means including a pawl carried by said punch hammer for actuating the resetting member and an unlatched selector bar.

2. A tape perforator comprising punch pins, movable selector bars, latching means for said bars, a pivoted resetting member having an extension bearing on the tops of said selector bars and another extension adapted to engage the bars to reset the same in the latched position, and means for actuating said resetting member.

3. A tape perforator comprising punch pins, reciprocable selector bars arranged side by side and movable into registry with said punch pins, said bars having notches in one side thereof, latching means for said bars and a resetting member for said bars, said resetting member comprising a pivoted sleeve having a projecting vane extending into the notches in said bars to restore the unlatched bars when the pivoted sleeve is rocked on its axis.

4. A tape perforator comprising punch pins, reciprocable selector bars arranged side by side and movable into registry with said punch pins, said bars having notches in one side thereof, latching means for said bars, a pivoted resetting member engaging the notches in said bars to restore the unlatched bars when the resetting member is rocked on its axis, an oscillating pawl engaging said resetting member, means for actuating said pawl to rock said resetting member and thereafter become disengaged therefrom and resilient means to restore said resetting member while it is disengaged from said pawl.

5. A tape perforator comprising punch mechanism including selectively operable controlling elements and a punch hammer, means for oscillating the punch hammer and means operatively associated with said punch hammer for restoring said controlling elements to normal.

6. In a telegraph receiving instrument, a selecting mechanism comprising a plurality of movable members each responsive to individual impulses of received permutation code signals, two independently movable bars, means for actuating one of said bars in response to the operation of any one of certain of said movable members and means for actuating the other of said bars in response to the operation of another of said movable members whereby the conjoint operation of said bars is effected in accordance with the character of the received signals.

7. In a telegraph receiving instrument, a selecting mechanism comprising a plurality of movable members each responsive to individual impulses of received permutation code signals, two sets of contacts in series relation, means for closing one of said sets of contacts only in response to the movement of one of said movable members and means for opening the other of said sets of contacts in response to the movement of any of the other of said movable members whereby the circuit including said contacts is closed upon receipt of a predetermined code combination.

8. A tape perforator comprising a plurality of movable selector bars, means for operating the respective bars in accordance with the individual impulses of received permutation code signals and a plurality of bail members each engaged by certain of said selector bars to be operated differently upon the receipt of one signal than in the case of another signal.

9. In combination with a tape perforator comprising a plurality of movable selector bars, circuit-closing means engaged thereby to be operated by said bars upon the occurrence of a predetermined setting of the selector bars during the cyclic operation of the perforator and means connected to said circuit-closing means to detect the repetition of said setting of the selector bars during successive cycles of operation.

10. In combination with a tape perforator comprising a plurality of movable selector bars, each representing an impulse of a telegraph code, movable members engaged by said bars to be variably operated by different code signals, an electrical circuit and means including said members for controlling said circuit upon the occurrence of a plurality of code signals of predetermined character in succession.

11. In combination, a tape perforator comprising a plurality of selecting magnets, a distributor having contacts individual to the respective magnets, means including said distributor for impressing code impulses upon said magnets and impulse-storing means associated with certain of said selecting magnets.

12. A tape perforator comprising selectively operable perforating means, means for controlling the same in accordance with code signals, timing mechanism, means to reset said timing mechanism in response to received signals, tape feeding means, means including said timing mechanism to operate said tape feeding means after the lapse of a predetermined time during which no signals are received to feed out blank tape, and a second timing mechanism for rendering said tape feeding means inoperative after a predetermined length of blank tape has been fed out.

13. A tape perforator comprising punch mechanism including a movable element, selector bars mounted for linear movement, resilient means engaging said bars, latching means for said bars, a common resetting member for said bars and means connected to the movable element of the punch mechanism for actuating said resetting member during each cycle of operation of the perforator to restore the unlatched bar or bars.

14. A tape perforator comprising movable selector bars, resilient means urging said selector bars to operative positions, means for latching said bars in their retracted positions, punch operating means and means operatively associated with said punch operating means for restoring unlatched selector bars to their retracted positions during each cycle of operation of the perforator.

15. In a tape perforator including a plurality of movable members set in accordance with received code impulses, contact mechanism engaged by said members to be operated upon the receipt of a predetermined code combination, said contact mechanism comprising a plurality of movable elements each engaged by certain but not all of said movable members.

16. In a tape perforator including a plurality of movable members set in accordance with received code impulses, a plurality of sets of contacts, means whereby each of said sets of contacts is operated by certain but not all of said movable members and a circuit including said plurality of sets of contacts to be conjointly controlled thereby upon the receipt of a predetermined code combination.

RAY HOOVER.